(12) United States Patent
Sala et al.

(10) Patent No.: US 8,730,978 B2
(45) Date of Patent: May 20, 2014

(54) ANALOG FRONT END PROTOCOL CONVERTER/ADAPTER FOR SLPI PROTOCOL

(75) Inventors: Leonardo Sala, Cornaredo (IT); Danilo Ranieri, Castellanza (IT); Kenneth Jay Helfrich, Duluth, GA (US)

(73) Assignee: Maxim Integrated Products, Inc, San Jose, CA (US)

( * ) Notice: Subject to any disclaimer, the term of this patent is extended or adjusted under 35 U.S.C. 154(b) by 427 days.

(21) Appl. No.: 12/895,772

(22) Filed: Sep. 30, 2010

(65) Prior Publication Data

US 2012/0082166 A1    Apr. 5, 2012

(51) Int. Cl.
*H04L 12/28* (2006.01)

(52) U.S. Cl.
USPC .......................................... 370/401; 370/312

(58) Field of Classification Search
USPC ................................. 370/401, 312
See application file for complete search history.

(56) References Cited

U.S. PATENT DOCUMENTS

| | | | |
|---|---|---|---|
| 6,380,797 B1* | 4/2002 | Macaluso et al. | 327/513 |
| 6,433,579 B1* | 8/2002 | Wang et al. | 326/38 |
| 7,098,685 B1* | 8/2006 | Agrawal et al. | 326/38 |
| 8,150,452 B2* | 4/2012 | Liang | 455/550.1 |
| 2003/0196022 A1* | 10/2003 | Cruz | 710/315 |
| 2005/0001792 A1* | 1/2005 | Watanabe et al. | 345/55 |
| 2007/0152947 A1* | 7/2007 | Tanaka et al. | 345/100 |
| 2007/0279095 A1* | 12/2007 | Jiang | 326/83 |
| 2009/0091389 A1* | 4/2009 | Koike | 330/257 |

* cited by examiner

*Primary Examiner* — Mark Rinehart
*Assistant Examiner* — Angel Brockman
(74) *Attorney, Agent, or Firm* — TIPS Group (57) ABSTRACT

In an embodiment, an analog front end (AFE) bridge for a SLPI PHY includes: an AFE LINK-side circuit having at least one pair of differential LINK-side nodes which does not conform to SLPI PHY specifications; an AFE PHY-side circuit having a pair of differential PHY-side nodes conforming to SLPI PHY specifications, wherein the AFE PHY-side circuit is coupled to the AFE LINK-side circuit; and a termination control circuit coupled to the AFE PHY-side circuit. A method of bridging a legacy LINK circuit to a SLPI PHY circuit includes: communicating with a legacy LINK circuit with a legacy LINK protocol; communicating with a SLPI PHY circuit with a SLPY PHY protocol over a differential pair; converting outputs of the legacy LINK circuit into inputs of the SLPI PHY circuit; converting outputs of the SLPI PHY circuit into inputs of the legacy LINK circuit; controlling a termination of the differential pair.

36 Claims, 9 Drawing Sheets

ANALOG FRONT END PROTOCOL CONVERTER/ADAPTER FOR SLPI PROTOCOL

BACKGROUND

The Open Systems Interconnections model (OSI model) is a product of the Open Systems Interconnection effort at the International Organization for Standardization. The OSI model subdivides communication systems into parts called "layers", each of which performs a collection of conceptually similar functions that provide services to a layer above it and which receives services from a layer below it. On each layer, an "instance" provides services to the instances at a layer above it and requests services from a layer below it.

The OSI model has two major components: an abstract model of networking known as the "Basic Reference Model" or "seven-layer model" and a set of specific protocols. Protocols enable an entity in one host to interact with a corresponding entity at the same layer in another host.

The first three layers under the seven-layer model are referred to as the "media layers." The remaining four layers are known as the "host layers." More particularly, layer 1 is the physical ("PHY") layer, layer 2 is the data link ("LINK" or, sometimes, "MAC") layer, layer 3 is the network layer, layer 4 is the transport layer, layer 5 is the session layer, layer 6 is the presentation layer and layer 7 is the application layer.

The PHY layer connects a LINK layer device to a physical medium such as an optical fiber or copper cable. The PHY layer is often the most complex part of the communication system and defines the electrical and physical specifications for devices. In particular, the PHY layer defines the relationship between a device and a transmission medium, such as a copper or optical cable. This includes the layout of pins, voltages, cable specifications, hubs, repeaters, network adapters, host bus adapters (HBA used in storage area networks) and more.

The major functions and services performed by the PHY layer include: 1) the establishment and termination of a connection to a communications medium; 2) participation in the process whereby communication resources are shared; and 3) modulation or conversion between digital data in user equipment and the corresponding signals transmitted over a communication network.

PHY layers are present in many interface technologies such as Wi-Fi, Ethernet, USB, IrDA, SATA, SDRAM and flash memory interfaces. For example, a PHY chip is integrated into most Universal Serial Bus (USB) controllers in hosts or embedded systems and provides the bridge between the digital and modulated parts of the interface.

Figure 1:
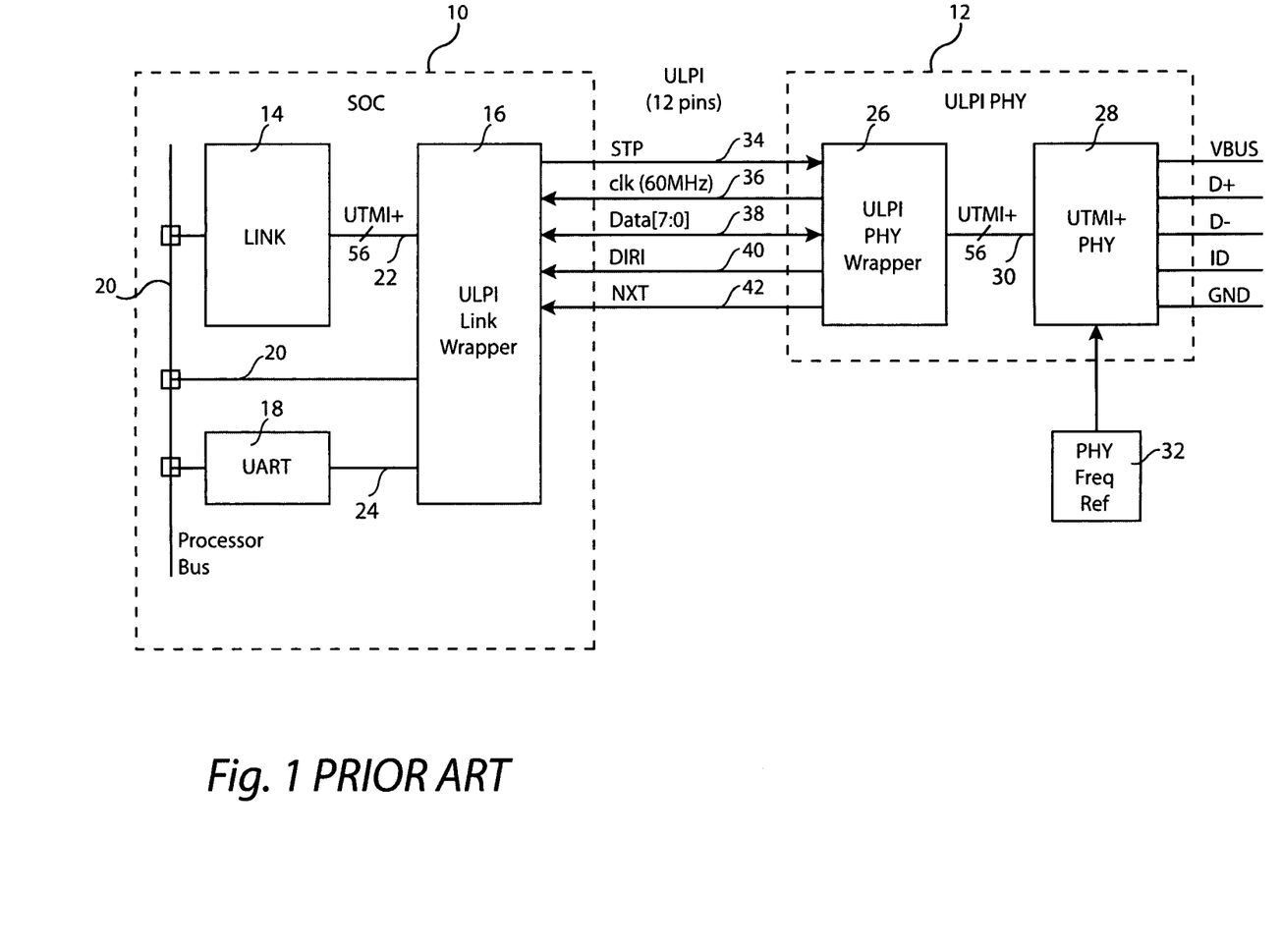
FIG. 1 is a block diagram of an example prior art ULPI LINK and ULPI PHY circuit.

FIG. 1 illustrates a LINK layer circuit SOC 10 and a PHY layer circuit ULPI PHY 12 of, for example, a USB interface. Circuits 10 and 12 communicate, in this example, using the Ultra Low Pin-count Interface ("ULPI") specification. The acronym "SOC" stands for "System On Chip."

SOC 10 includes link logic 14, ULPI Link Wrapper 16 and a UART 18, all of which are coupled to a processor bus 20. Link logic 14 is coupled to ULPI Link Wrapper by a 56 line UTMI+ bus 22 and UART 18 is coupled to ULPI Link Wrapper 16 by a line 24.

ULPI PHY 12 includes ULPI PHY Wrapper logic 26 and a UTMI+ PHY 28 which are coupled together by a UTMI+ bus 30. A PHY frequency reference 32 is coupled to UTMI+ PHY 28. The output of UTMI+ PHY 28 includes VBUS, D+, D−, ID and GND, in this example. The ULPI Link Wrapper is also coupled directly to the processor bus 20.

The ULPI specification calls for 12 pins or lines to connect the SOC 10 and the ULPI PHY 12. These 12 pins include a STP line 34, a clk (60 MHz) line 36, an eight-bit data bus 38 ("Data [7:0]"), a DIR line 40 and a NXT line 42. The ULPI Link Wrapper 16 communicates with the ULPI PHY Wrapper 26 using these 12 lines or pins.

Figure 2:
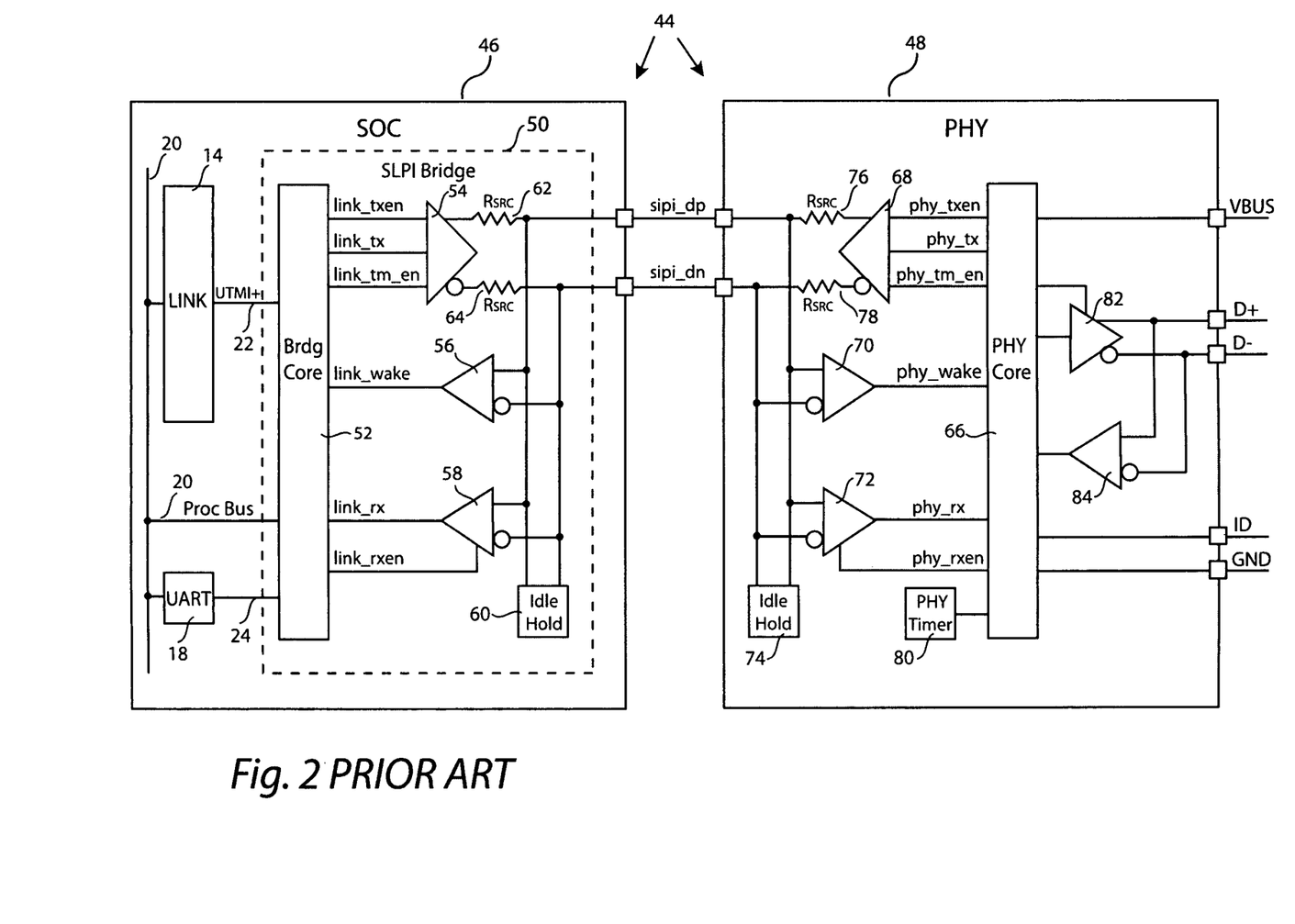
FIG. 2 is a block diagram of an example prior art SLPI LINK and a SLPI PHY circuit.

FIG. 2 illustrates SLPI circuitry 44 designed to implement a new PHY specification known as the Serial Link Peripheral Interface ("SLPI"), which has been under development for the past few years. The Serial Link PHY Interface (SLPI) Specification, incorporated herein by reference, was published on Sep. 10, 2010 as Revision 0.82t. A release Revision 9.0 is expected by December 2010.

With continuing reference to FIG. 2, SLPI circuitry 44 includes an SOC circuit 46 and a PHY circuit 48. The front end of SOC circuit 46 can be of similar design to the SOC 10 of FIG. 1, where like reference numerals correspond to like elements. The back end of SOC circuit 46, however, includes a SLPI Bridge 50 which has differential outputs slpi_dp and slpi_dn which conform to the new SLPI standards. Bridge 50 includes a bridge core 52, a differential transmitter 54, two differential receivers 56 and 56, an Idle/Hold circuit 60 and two termination resistors 62 and 64.

PHY circuit 48 includes a PHY core 66, a differential transmitter 68, two differential receivers 70 and 72, an Idle/Hold circuit 74 and two termination resistors 76 and 78. The PHY circuit 48 also includes a PHY Timer 80, a differential transmitter 82 and a differential receiver 84. The output of PHY circuit 48 includes the same pins or lines as the UTMI+ PHY 28 of FIG. 1, namely VBUS, D+, D−, ID and GND, in this example.

The SLPI specification will provide a communication system having a number of improvements over that of the ULPI specification including: 1) a lower number of input wires (two with SLPI versus twelve with ULPI); 2) single ended signaling (SLPI is fully differential and terminated, resulting in lower emissions, improved immunity and longer traces); 3) lower power (e.g. SLPI my use 500 µA v. 15 mA with ULPI); 4) less timing restraints (SLPI has independent clock references for PHY and LINK); 5) a smaller footprint (SLPI can be, for example, 4×4 WLP while ULPI cannot be smaller than 5×5 WLP); and 6) native support for Link-2-Link communication.

Due to the many advantages of SLPI over ULPI it is expected that SLPI will eventually replace ULPI for most applications in the coming years. However, the new SLPI specification requires both a new protocol and new electrical bus (2 wires, fully differential, dynamically terminated) which cannot be derived from any of the existing differential interfaces, such as Low Voltage Differential Signaling ("LVDS") or Reduced Swing Differential Signaling ("RSDS") used in conjunction with the ULPI specification. This is unfortunate, in that is it relatively easy to connect, for example, Field Programmable Gate Arrays ("FPGAs") as LINK circuits implementing ULPI protocols using General Purpose Input/Outputs ("GPIOs"), none of which can be adapted to be compatible with the SLPI electrical bus specification. In consequence, FPGAs or Application Specific Integrated Circuits (ASICs) equipped with GPIO/LVDS/RSDS I/Os won't be able to communicate with a SLPI PHY.

It typically takes a number of years for a new standard to be adopted. In the case of the SLPI specification, it is anticipated that SLPI PHYs will become available, due to their many advantages as set forth above, before the LINK-side FPGAs and ASICs are modified to accommodate the new SLPI electrical standard.

These and other limitations of the prior art will become apparent to those of skill in the art upon a reading of the following descriptions and a study of the several figures of the drawing.

SUMMARY

In an embodiment, set forth by way of example and not limitation, an analog front end ("AFE") bridge for a SLPI PHY includes an AFE LINK-side circuit having at least one pair of differential LINK-side nodes which does not conform to SLPI PHY specifications and an AFE PHY-side circuit having a pair of differential PHY-side nodes conforming to SLPI PHY specifications, wherein the AFE PHY-side circuit is coupled to the AFE LINK-side circuit. Optionally, the AFE bridge can include a termination control circuit coupled to the AFE PHY-side circuit.

In an embodiment, set forth by way of example and not limitation, a method of bridging a legacy LINK circuit to a SLPI PHY circuit includes: communicating with a legacy LINK circuit with a legacy LINK protocol; communicating with a SLPI PHY circuit with a SLPY PHY protocol over a differential pair; converting outputs of the legacy LINK circuit into inputs of the SLPI PHY circuit; converting outputs of the SLPI PHY circuit into inputs of the legacy LINK circuit; and controlling a termination of the differential pair.

In an embodiment, set forth by way of example and not limitation, a bridge apparatus includes: means communicating with a legacy LINK circuit with a legacy LINK protocol; means communicating with a SLPI PHY circuit with a SLPY PHY protocol over a differential pair; means converting outputs of the legacy LINK circuit into inputs of the SLPI PHY circuit; means converting outputs of the SLPI PHY circuit into inputs of the legacy LINK circuit; and means controlling a termination of the differential pair.

In an embodiment, set forth by way of example and not limitation, a USB SLPI PHY includes: a LINK-side AFE including at least one pair of differential LINK-side nodes which does not conform to SLPI PHY specifications; a SLPI FSM coupled to the AFE; and a USB AFE coupled to the SLPI FSM.

In an embodiment, set forth by way of example and not limitation, a USB circuit includes: a legacy LINK circuit which does not conform to SLPI PHY protocols; a SLPI PHY circuit; and a SLPI AFE bridge circuit coupled between the legacy LINK circuit and the SLPI PHY circuit.

In an embodiment, set forth by way of example and not limitation, A USB circuit includes: a legacy LINK circuit which communicates with a legacy protocol; and a SLPI PHY circuit including an AFE protocol conversion circuit which is coupled to the legacy LINK circuit to communicate with the legacy protocol.

An advantage of an example embodiment is that a SLPI PHY may be used with FPGAs or ASICs asking as a USB LINK which do not have native support for the SLPI bus. This allows earlier adoption of SLPI PHYs and lower cost alternatives in communication systems utilizing SLPI PHYs.

An advantage of another example embodiment is that a SLPI analog front end can be added to a SLPY PHY to make it compatible with other communication interfaces, such as LVDS. This embodiment allows the modified SLPY PHY to become almost plug compatible with other PHY specification types.

These and other embodiments and advantages and other features disclosed herein will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, but not to limit, the invention. The drawings include the following figures.

DETAILED DESCRIPTIONS

FIGS. 1 and 2 were described with respect to the prior art. However, portions of the circuitry described with respect to these two prior art figures may be included in circuitry of certain embodiments described herein.

Figure 3:
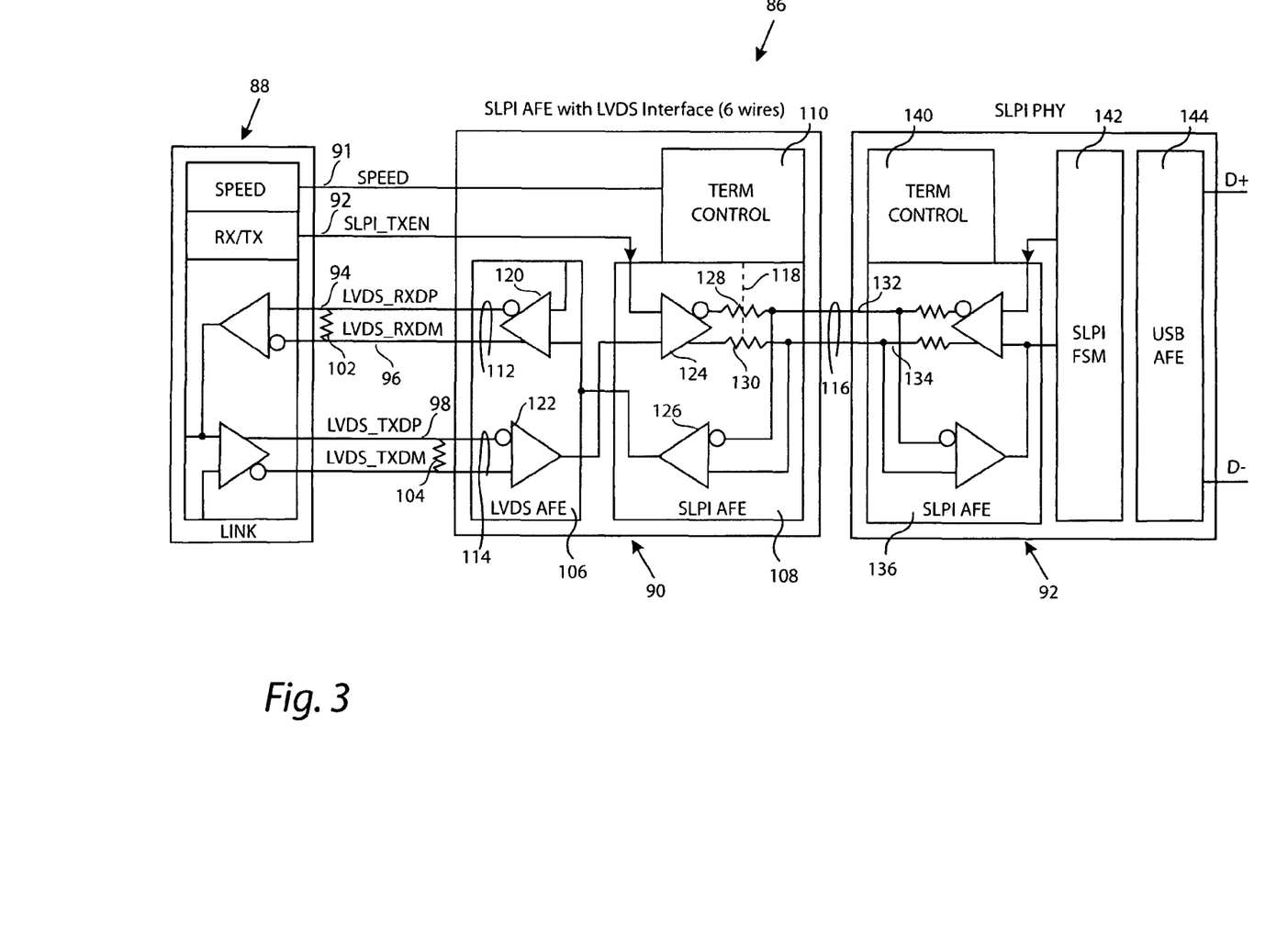
FIG. 3 is a block diagram of an example LINK, SLPI AFE and SLPI PHY circuit.

FIG. 3 is a block diagram of a USB circuit 86, set forth by way of example and not limitation, which includes a legacy LINK circuit 88, a SLPI AFE bridge circuit 90 and a SLPI PHY circuit 92. The legacy LINK circuit 88 may be implemented with, for example, ASIC or FPGA technologies, and communicate with a legacy protocol, i.e. not with a SLPI PHY protocol. For example, the legacy LINK circuit 88 may communicate using GPIO, LVDS, and/or RSDS interfaces. In this example, the legacy LINK circuit 88 comprises a 6-wire LVDS interface including a SPEED line 91, a SLPI_TXEN line 92, a LVDS_RXDP line 94, a LVDS_RXDM line 96, a LVDS_TXDP line 98 and a LVDS_TXDM line 100. A voltage drop resistor 102 is coupled between lines 94 and 96 and a voltage drop resistor 104 is coupled between lines 98 and 100.

SLPI AFE ("Analog Front End") bridge circuit 90 includes an AFE LINK-side circuit 106, an AFE PHY-side circuit 108 and an optional termination control circuit 110. The AFE LINK-side circuit, in this non-limiting example, includes two pair of differential LINK-side nodes 112 and 114 which do not conform to SLPI PHY specifications. In this example, the differential LINK-side nodes 112 and 114 conform to the LVDS interface specifications. The AFE PHY-side circuit 108 includes a pair of differential PHY-side nodes 116 conforming to SLPI PHY specifications. The AFE PHY-side circuit 108 is coupled to the AFE LINK-side circuit 106. The termination control circuit 110 is coupled to the AFE PHY-side circuit 108 as indicated by a broken line 118. A non-limiting example of a termination control circuit 110 will be discussed in greater detail with respect to FIG. 9.

AFE LINK-side circuit 106, in this example, includes a first differential output converter 120 and a first differential input converter 122. As used herein, a "differential output converter" refers to a differential driver which outputs a signal on a pair of differential lines from the circuit (such as SLPI AFE bridge circuit 90) and a "differential input converter" refers to a differential driver which inputs a differential signal from a pair of differential lines into the circuit.

AFE PHY-side circuit 108 includes a second differential output converter 124 and a second differential input converter 126. In this example embodiment, the first differential output converter 120 is coupled to the second differential input converter 126 and the first differential input converter 122 is coupled to the second differential output converter 124.

The AFE PHY-side circuit 108 further includes a pair of termination resistors 128 and 130. More particularly, in this example, a first termination resistor 128 is coupled to a first node 132 of the pair of differential PHY-side nodes 116 and a second termination resistor 130 is coupled to a second node 132 of the pair of differential PHY-side nodes 116. The optional termination control circuit 110 controls the effect of the first termination resistor and the second termination resistor, as will be discussed in greater detail subsequently. In this example embodiment, the SPEED input is coupled to the termination control circuit 110, and the SLPI_TXEN input is coupled to the AFE PHY-side circuit 108.

In an embodiment, set forth by way of example and not limitation, the two pair of differential LINK-side nodes 112 and 114 conform to LVDS specifications. For example, nodes 112 carry the LVDS_RXDP and LVDS_RXDM signals and are coupled to the first differential output converter 120 and nodes 114 carry the LVDS_TXDP and LVDS_TXDM signals coupled to the first differential input converter 122.

The SLPI PHY circuit 92 conforms to the aforementioned SLPI PHY specifications. Briefly, SLPI PHY circuit 92 includes an SLPI AFE circuit 136, a termination control circuit 140, a SLPI FSM circuit 142 and a USB AFE circuit 144, in this non-limiting example.

The operation of the USB circuit 86 includes the SLPI AFE bridge circuit 90 communicating with a legacy LINK circuit 88 with a legacy LINK protocol such LVDS. The SLPI AFE bridge circuit 90 also communicates with SLPI PHY 92 with a SLPY PHY protocol over differential pair 116. The SLPI AFE bridge circuit 90 converts outputs of legacy LINK circuit 88 into inputs of the SLPI PHY circuit 92 and converts outputs of SLPI PHY circuit 92 into inputs of said legacy LINK circuit 88. Furthermore, example SLPI AFE bridge circuit 90 controls the termination of the differential pair 116. In an example embodiment, the control of the termination is based, at least in part, upon the transmission speed of the USB circuit 88.

Figure 4:
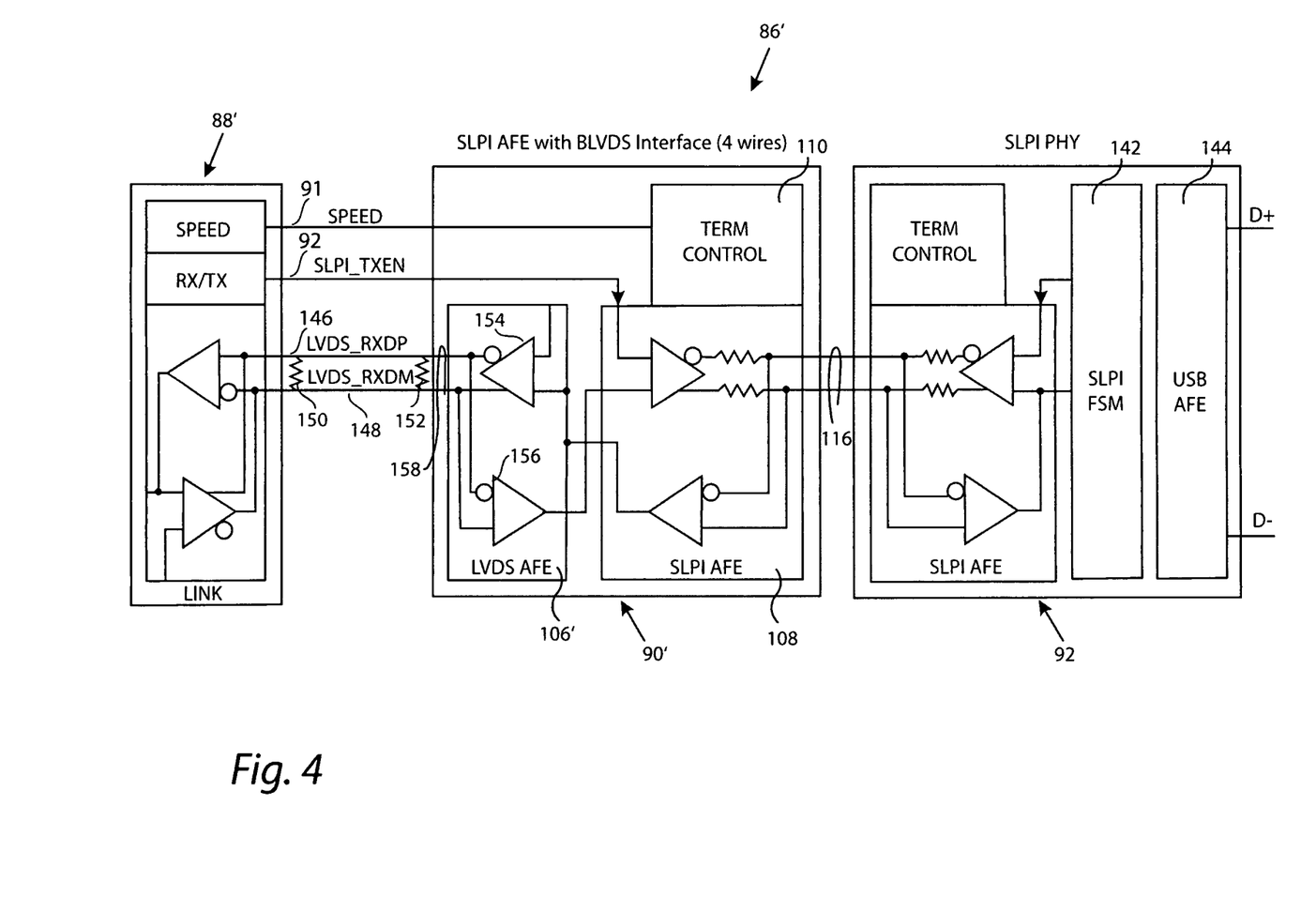
FIG. 4 is a block diagram of another example LINK, SLPI AFE and SLPI PHY circuit.

FIG. 4 is a block diagram of an alternative USB circuit 86', set forth by way of example and not limitation. Like reference numerals in FIG. 4 correspond to like reference numerals in FIG. 3. The major difference between the embodiments of FIGS. 3 and 4 is that the protocol used for communication between the legacy LINK circuit and the SLPI AFE bridge circuit is a 6-wire LVDS interface in the embodiment of FIG. 3 and a 4-wire BLVDS interface in the embodiment in FIG. 4. The BLVDS protocol requires fewer wires (and therefore pins) because the protocol for LVDS requires two simplex differential signal pairs and the protocol for BLVDS requires a one duplex differential signal pair.

In the example of FIG. 4, a legacy LINK circuit 88' includes the signals SPEED and SLPI_TXEN on lines 91 and 92 and the duplex differential signals LVDS_RXDP and LVDS_RXDM on lines 146 and 148, respectively. Two voltage dropping resistors 150 and 152 are coupled across lines 146 and 148 near their ends, in this example. Also in this example, a AFE LINK-side circuit 106' includes a first differential output converter 154 and a first differential input converter 156 coupled to a single pair of differential LINK-side nodes 158. The USB circuit 86' operates in much the same manner as the USB circuit 86, but requires fewer connecting wires.

Figure 5:
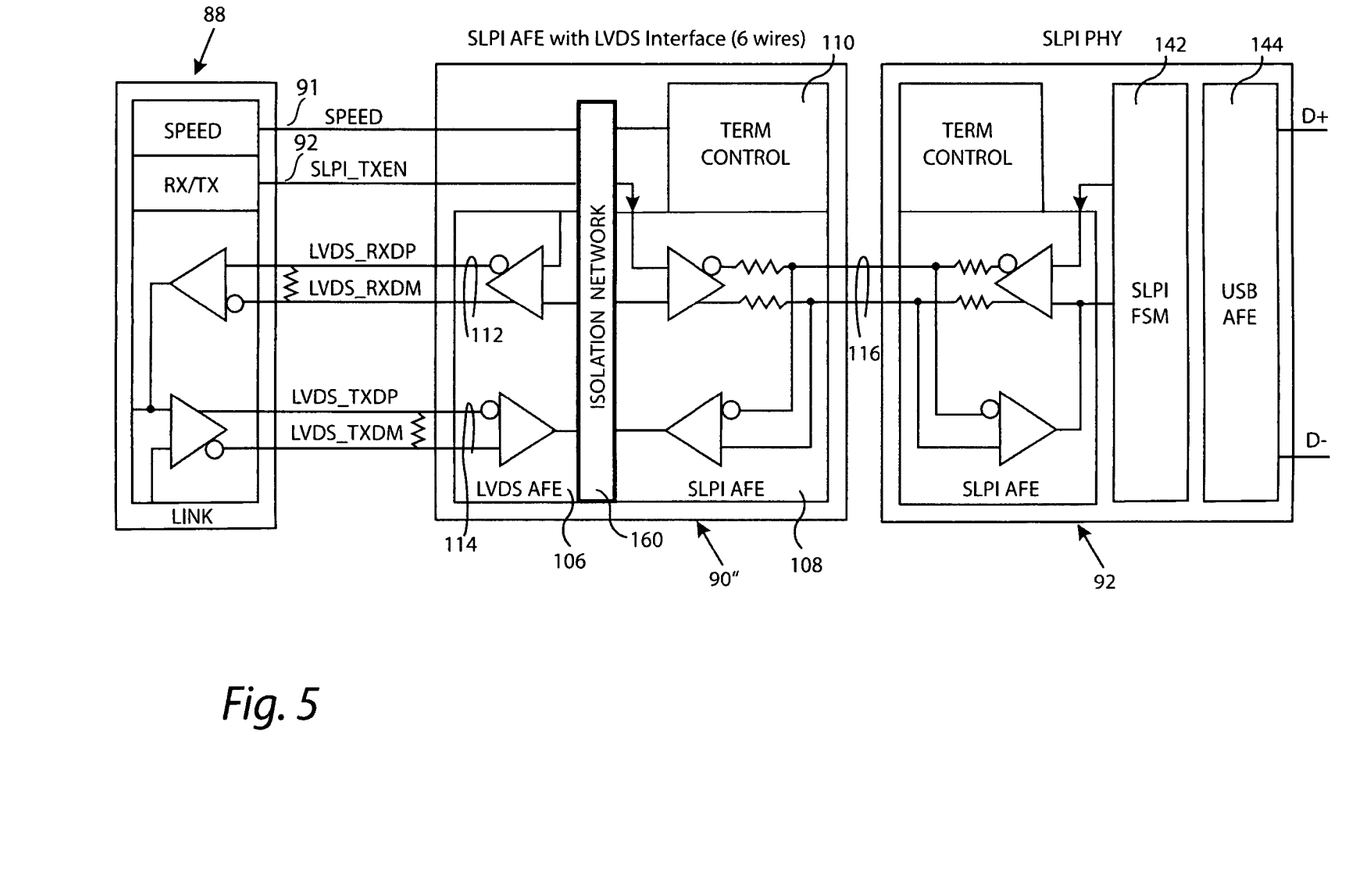
FIG. 5 is a block diagram of an example LINK, SLPI AFE, and SLPI PHY circuit similar to FIG. 3, but with the addition of an isolation network in the SLPI AFE.

FIG. 5 is a block diagram of another alternative USB circuit 86", set forth by way of example and not limitation. Like reference numerals in FIG. 5 correspond to like reference numerals in FIGS. 3 and 4. The embodiment of FIG. 5 is similar, in particular, to the embodiment of FIG. 3 but differs in that an isolation network 160 has been added to the SLPI AFE bridge circuit 90". In this example embodiment, the isolation network 160 couples AFE LINK-side circuit 106 and AFE PHY-side circuit 108. Also by way of example, isolation network 160 couples the SPEED line 91 to the termination control circuit 110 and the SLPI_TXEN line 92 to AFE PHY-side circuit 108.

The isolation network 160 can take a variety of forms, as will be appreciated by those of skill in the art. For example, isolation network may include an optical isolation network. By providing an isolation network, such as isolation network 160, legacy LINK circuit 88 can be electrically isolated from the SLPI PHY 92 reducing noise, cross-talk, etc. within the USB circuit 86".

Figure 6:
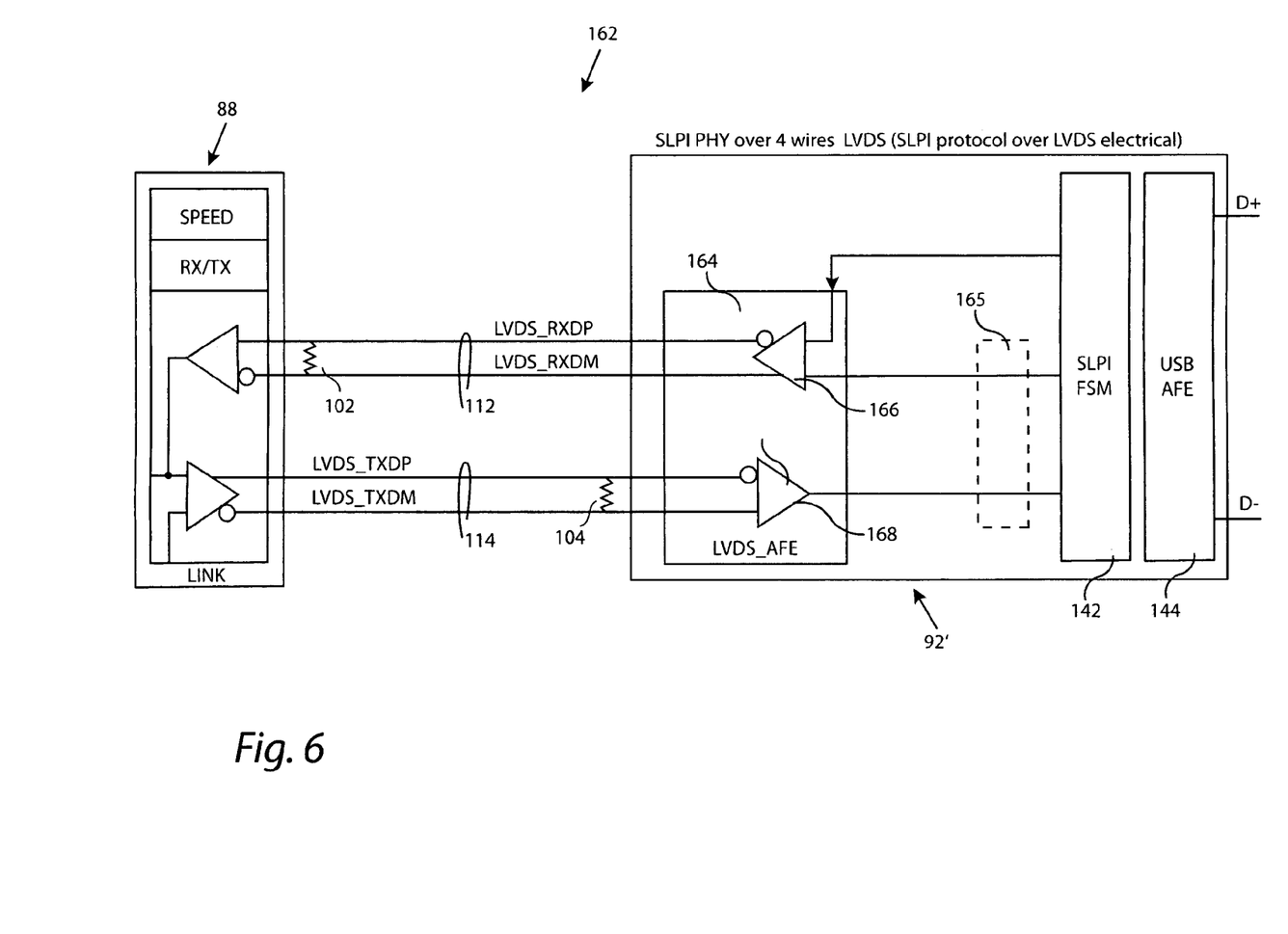
FIG. 6 is a block diagram of an example LINK and SLPI PHY over 4 wires LVDS.

FIG. 6 is a block diagram of another alternative USB circuit 162, set forth by way of example and not limitation. Like reference numerals in FIG. 6 correspond to like reference numerals in the preceding figures. This example embodiment includes a legacy LINK circuit 88 and a USB SLPI PHY 92'. The SLPI PHY 92' includes SLPI FSM 142 and USB AFE 144. The SLPI FSM 142 is coupled to a LINK-side AFE 164 that has two differential LINK-side nodes 112 and 114 which do not conform to SLPI PHY specifications. In this example, the LINK-side AFE 164 includes a differential output converter 166 and a differential input converter 168. In this non-limiting example, the LINK specification is a 4-wire LVDS specification, which is caused to emulate the SLPI protocol over an LVDS electrical connection.

The embodiment of FIG. 6 has the advantage of being operational with a legacy LINK circuit 88 without requiring a SLPI AFE bridge circuit. This embodiment also does not require the SPEED and RX/TX signals, reducing wire count. In an alternate embodiment, an isolation circuit 165, having the characteristics of isolation circuits described above, may optionally be provided between the LINK-side AFE 164 and the SLPI FSM 142.

Figure 7:
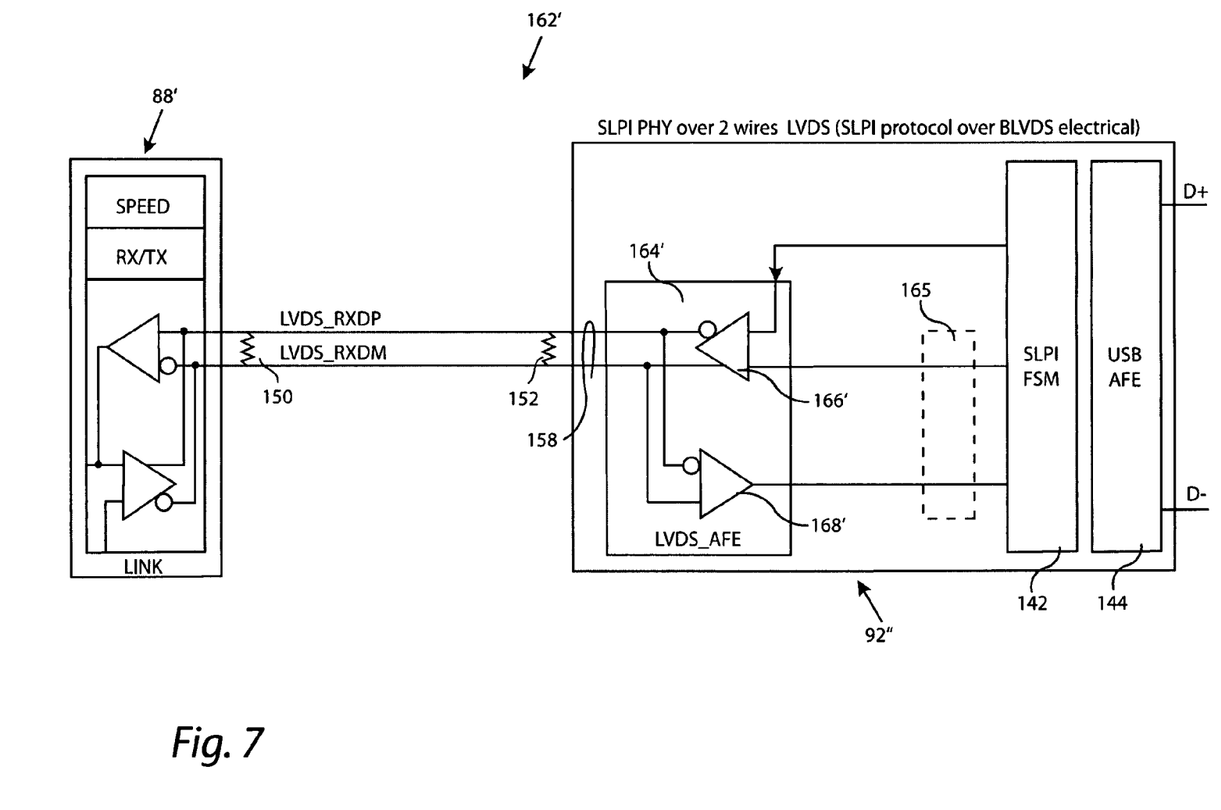
FIG. 7 is a block diagram of an example LINK and SLPI PHY over 2 wires LVDS circuit.

FIG. 7 is a block diagram of another alternative USB circuit 162', set forth by way of example and not limitation. Like reference numerals correspond to like reference numerals in the preceding figures. This example embodiment includes a legacy LINK circuit 88' and a USB SLPI PHY 92". The SLPI PHY 92" includes SLPI FMS 142 and USB AFE 144. The SLPI FSM 142 is coupled to a LINK-side AFE 164' has a single pair of differential LINK-side nodes 158 which does not conform to SLPI PHY specifications. In this example, LINK-side AFE 164' includes a differential output converter 166' and a differential input converter 168'. In this non-limiting example, the LINK specification is a 2-wire LVDS, which is caused to emulate a SLPI protocol over a BLVDS electrical connection. In an alternate embodiment, an isolation circuit 165, as described previously, can optionally be provided between the LINK-side AFE 164' and the SLPI FSM 142.

Figure 8:
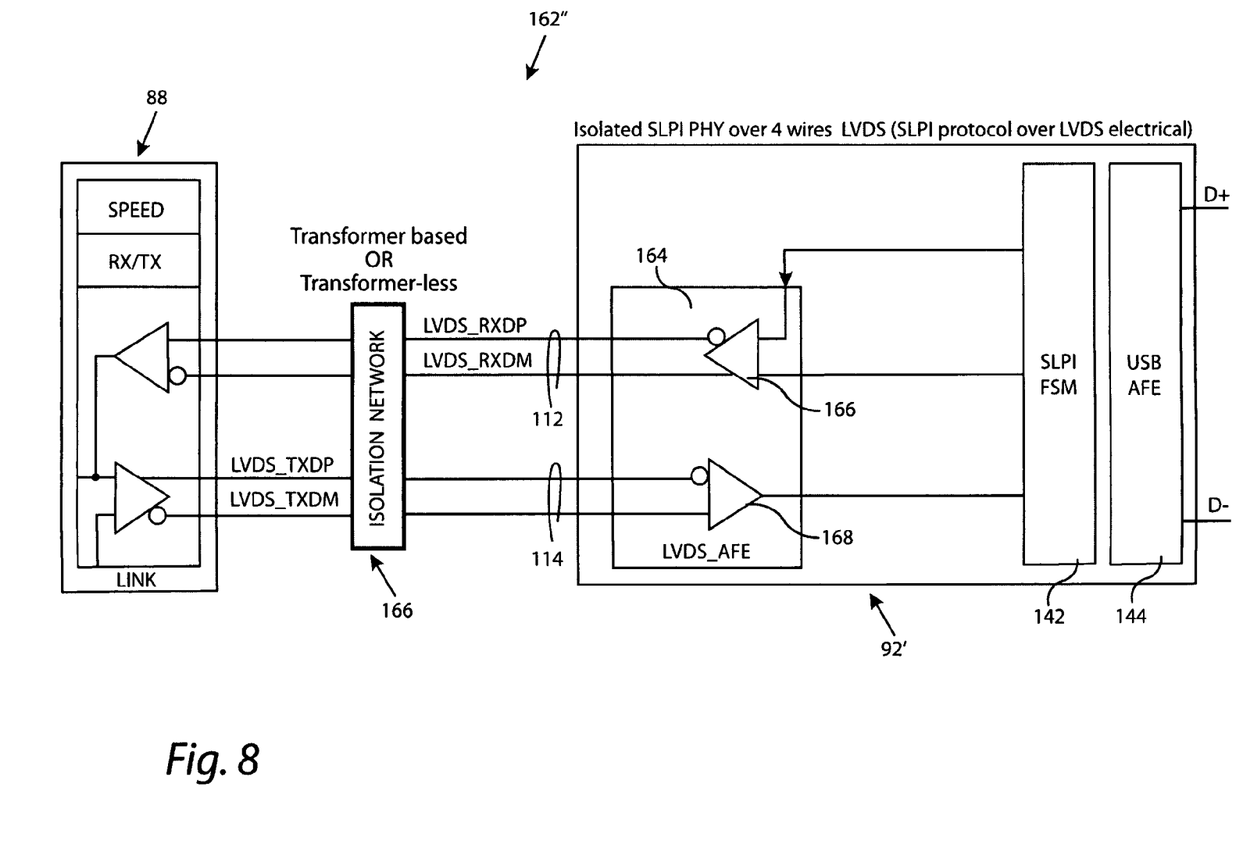
FIG. 8 is a block diagram of an example LINK and SLPI PHY over 4 wires LVDS circuit similar to FIG. 6 with an isolation network.

FIG. 8 is a block diagram of another alternative USB circuit 162", set forth by way of example and not limitation. Like reference numerals of FIG. 6" correspond to like reference numerals in the preceding figures. This example embodiment is very similar to the embodiment of FIG. 6, with the exception of the insertion of an isolation network 166 into the differential pair lines 112 and 114. Certain example advantages of electrical isolation have been mentioned above. Since the isolation network is external to the circuitry of the legacy LINK circuit 88 and SLPI PHY 92' magnetic isolation technologies, such as transformers, can be conveniently employed. Alternatively, other isolation technologies can also be conveniently used.

Figure 9:
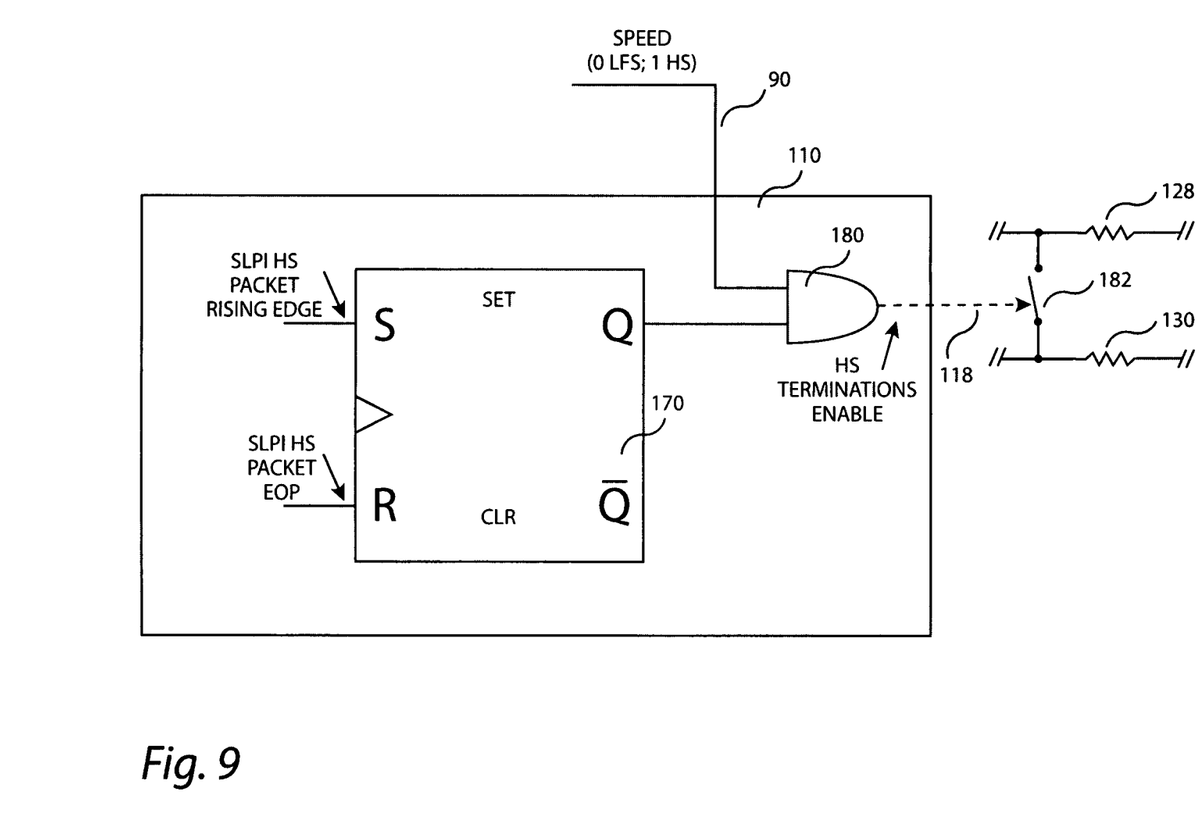
FIG. 9 is schematic of an example termination control circuit which may be used in certain example embodiments.

FIG. 9 is a schematic of an example, and optional, termination circuit 110. Like reference numerals in FIG. 9 correspond to like reference numerals in the earlier figures. The termination circuit 110, set forth by way of example and not limitation, includes an S/R flip-flop 170, an AND gate 180, and an electronic switch 182. The S input to flip-flop 170 has, as an input, the SLPI HS packet rising edge. The R input to flip-flop 170 is coupled to the SLPI HS packet EOP. One input of AND gate 180 is coupled to SPEED line 90, and the other input of AND gate 180 is coupled to the Q output of flip-flop 180. The output of AND gate 180 controls the electronic switch 182 as shown by broken line 118. The electronic switch, which may be conveniently be a MOSFET transistor, is coupled between termination resistors 128 and 130 to control the termination impedance of the device.

Termination circuit 110 can be provided to reduce the power consumption of the device, as explained below. Other circuits can also be employed for that purpose, as will be appreciated by those of skill in the art. Furthermore, termination circuit 110 can be omitted to lower the cost of the device, especially if the device is to be used in modes that have a naturally lower rate of power consumption.

Termination control 110 operates, in this example, as follows. In FS, the terminations are always disconnected to save power. In HS, the terminations are dynamically controlled in such a way that they are connected as soon as some SLPI traffic is detected and they are disconnected at a proper time after the detection of the End of Packet (EOP). This has the desirable affect that the additional DC current flowing into the termination resistors 128 and 130 is used only when it is most favorable to do so, e.g. during the transfer of an SLPI packet for such purposes as transmitting USB data or performing a Register File Access at HS.

It should be noted that while, in certain example embodiments, SPEED and TX_EN signals can be controlled directly by the LINK, in other examples these signals can be controlled by another interface, e.g. an I2C interface as a non-limiting example. In this example, the signals can be controlled together and/or independently by, for example, writing through the I2C interface to dedicated bit(s) of a register file of, for example, a SLPI AFE bridge. This configuration therefore allows various combinations, e.g. the SPEED signal can be controlled directly and the TX_EN signal can be controlled by I2C, or the TX_EN signal can be controlled directly and the SPEED signal can be controlled by I2C, or both the SPEED signal the TX_EN signal can be controlled by I2C. It should be noted that there are a variety of interface standards which can be used to flexibly control signals such as SPEED and TX_EN beside the I2C interface, the SPI interface being another non-limiting example.

Although various embodiments have been described using specific terms and devices, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of various other embodiments may be interchanged either in whole or in part. It is therefore intended that the claims be interpreted in accordance with the true spirit and scope of the invention without limitation or estoppel.

What is claimed is:

1. An analog front end bridge for a Serial Link Peripheral Interface (SLPI) physical layer (PHY) circuit comprising:
    an analog front end (AFE) data link layer (LINK)-side circuit having at least one pair of differential LINK-side nodes which conforms to Ultra Low Pin-count Interface ("ULPI") specifications and does not conform to SLPI PHY specifications; and
    an AFE PHY-side circuit having a pair of differential PHY-side nodes conforming to SLPI PHY specifications, wherein said AFE PHY-side circuit is coupled to said AFE LINK-side circuit.

2. An analog front end bridge for a SLPI PHY circuit as recited in claim 1 further comprising a termination control circuit coupled to said AFE PHY-side circuit.

3. An analog front end bridge for a SLPI PHY circuit as recited in claim 2 wherein said AFE LINK-side circuit includes a first differential output converter and a first differential input converter and wherein said AFE PHY-side circuit includes a second differential output converter and a second differential input converter.

4. An analog front end bridge for a SLPI PHY circuit as recited in claim 3 wherein said first differential output converter is coupled to said second differential input converter and wherein said first differential input converter is coupled to said second differential output converter.

5. An analog front end bridge for a SLPI PHY circuit as recited in claim 4 further comprising a first termination resistor coupling said second differential output converter to a first node of said pair of differential PHY-side nodes and a second termination resistor coupling said second differential output converter to a second node of said pair of differential PHY-side nodes.

6. An analog front end bridge for a SLPI PHY circuit as recited in claim 5 wherein said termination control circuit controls said first termination resistor and said second termination resistor.

7. An analog front end bridge for a SLPI PHY circuit as recited in claim 6 further comprising a first input coupled to said termination control circuit and a second input coupled to said AFE PHY-side circuit.

8. An analog front end bridge for a SLPI PHY circuit as recited in claim 7 wherein said at least one pair of differential LINK-side nodes conform to Low Voltage Differential Signaling (LVDS) specifications.

9. An analog front end bridge for a SLPI PHY circuit as recited in claim 8 wherein said AFE LINK-side circuit has two pairs of differential LINK-side nodes including a first pair of differential LINK-side nodes carrying a first LVDS signal and a second LVDS signal coupled to said first differential output converter and a second pair of differential LINK-side nodes carrying a third LVDS signal and a fourth LVDS signal coupled to said first differential input converter.

10. An analog front end bridge for a SLPI PHY circuit as recited in claim 7 wherein said at least one pair of differential LINK-side nodes conform to Bus Low-Voltage Differential Signaling (BLVDS) specifications.

11. An analog front end bridge for a SLPI PHY circuit as recited in claim 10 wherein said AFE LINK-side circuit has a single pair of differential LINK-side nodes carrying a first LVDS signal and a second LVDS signal coupled to said first differential output converter and to said first differential input converter.

12. An analog front end bridge for a SLPI PHY circuit as recited in claim 7 wherein said AFE PHY-side circuit is coupled to said AFE LINK-side circuit by an isolation network.

13. A method of bridging a legacy data link layer (LINK) circuit to a Serial Link Peripheral Interface (SLPI) physical layer (PHY) circuit comprising:
   communicating with a legacy LINK circuit with a legacy LINK protocol which conforms to Ultra Low Pin-count Interface ("ULPI") specifications;
   communicating with a SLPI PHY circuit with a SLPI PHY protocol over a differential pair;
   converting outputs of said legacy LINK circuit into inputs of said SLPI PHY circuit;
   converting outputs of said SLPI PHY circuit into inputs of said legacy LINK circuit; and
   controlling a termination of said differential pair.

14. A method of bridging a legacy LINK circuit to a SLPI PHY circuit as recited in claim 13 wherein controlling a termination is based upon a speed of transmission between said legacy LINK circuit and said SLPI PHY circuit.

15. A method of bridging a legacy LINK circuit to a SLPI PHY circuit as recited in claim 14 further comprising electrically isolating said legacy LINK circuit from said SLPI PHY circuit.

16. A method of bridging a legacy LINK circuit to a SLPI PHY circuit as recited in claim 15 wherein an interface to said legacy LINK circuit is one of a 6-wire Low Voltage Differential Signaling (LVDS) interface and a 4-wire Bus Low-Voltage Differential Signaling (BLVDS) interface.

17. A bridge apparatus comprising:
   means communicating with a legacy data link layer (LINK) circuit with a legacy LINK protocol which conforms to Ultra Low Pin-count Interface ("ULPI") specifications;
   means communicating with a Serial Link Peripheral Interface (SLPI) physical layer (PHY) circuit with a SLPI PHY protocol over a differential pair;
   means converting outputs of said legacy LINK circuit into inputs of said SLPI PHY circuit;
   means converting outputs of said SLPI PHY circuit into inputs of said legacy LINK circuit; and
   means controlling a termination of said differential pair.

18. A bridge apparatus as recited in claim 17 wherein said means controlling a termination is based upon a speed of transmission between said legacy LINK circuit and said SLPI PHY circuit.

19. A bridge apparatus as recited in claim 18 further comprising an isolation network.

20. A bridge apparatus as recited in claim 19 wherein said means communicating with a legacy LINK circuit comprises one of a 6-wire Low Voltage Differential Signaling (LVDS) interface and a 4-wire Bus Low-Voltage Differential Signaling (BLVDS) interface.

21. A Universal Serial Bus (USB) Serial Link Peripheral Interface (SLPI) physical layer (PHY) circuit comprising:
   a data link layer (LINK)-side analog front end (AFE) including at least one pair of differential LINK-side nodes which conforms to Ultra Low Pin-count Interface ("ULPI") specifications and does not conform to SLPI PHY specifications;
   a SLPI Finite State Machine (FSM) coupled to said AFE; and
   a USB AFE coupled to said SLPI FSM.

22. A USB SLPI PHY circuit as recited in claim 21 wherein said LINK-side AFE includes a differential output converter and a differential input converter.

23. A USB SLPI PHY circuit as recited in claim 22 wherein said at least one pair of differential LINK-side nodes conform to Low Voltage Differential Signaling (LVDS) specifications.

24. A USB SLPI PHY circuit as recited in claim 23 wherein said at least one pair of differential LINK-side nodes includes a first pair of differential LINK-side nodes having a first LVDS node and a second LVDS node coupled to said differential output converter and a second pair of differential LINK-side nodes having a third LVDS node and a fourth LVDS node coupled to said differential input converter.

25. A USB SLPI PHY circuit as recited in claim 22 wherein said at least one pair of differential LINK-side nodes conform to Bus Low-Voltage Differential Signaling (BLVDS) specifications.

26. A USB SLPI PHY circuit as recited in claim 25 wherein said at least one pair of differential LINK-side nodes is a single pair of differential LINK-side nodes including a first LVDS node and a second LVDS node coupled to said differential output converter and to said differential input converter.

27. A Universal Serial Bus (USB) circuit comprising:
   a legacy data link layer (LINK) circuit which conforms to Ultra Low Pin-count Interface ("ULPI") specifications and does not conform to Serial Link Peripheral Interface (SLPI) physical layer (PHY) circuit specifications;
   a SLPI PHY circuit; and
   a SLPI analog front end (AFE) bridge circuit coupled between said legacy LINK circuit and said SLPI PHY circuit.

28. A USB circuit as recited in claim 27 wherein an interface to said legacy LINK circuit is one of a 6-wire Low Voltage Differential Signaling (LVDS) interface and a 4-wire Bus Low-Voltage Differential Signaling (BLVDS) interface.

29. A USB circuit as recited in claim 28 wherein said SLPI AFE bridge circuit includes an isolation network.

30. A USB circuit as recited in claim 28 further comprising an isolation network disposed between said legacy LINK circuit and said SLPI AFE bridge circuit.

31. A USB circuit as recited in claim 28 further comprising at least one voltage drop resistor coupled between two wires of said interface.

32. A Universal Serial Bus (USB) circuit comprising:
   a legacy data link layer (LINK) circuit which communicates with a legacy protocol which conforms to Ultra Low Pin-count Interface ("ULPI") specifications; and
   a Serial Link Peripheral Interface (SLPI) physical layer (PHY) circuit including an analog front end (AFE) protocol conversion circuit which is coupled to said legacy LINK circuit to communicate with said legacy protocol.

33. A USB circuit as recited in claim 32 wherein an interface to said legacy LINK circuit is one of a 4-wire Low Voltage Differential Signaling (LVDS) interface and a 2-wire Bus Low-Voltage Differential Signaling (BLVDS) interface.

34. A USB circuit as recited in claim 33 wherein said SLPI PHY circuit includes an isolation network.

35. A USB circuit as recited in claim 34 further comprising an isolation network disposed between said legacy LINK circuit and said SLPI PHY circuit.

36. A USB circuit as recited in claim 33 further comprising at least one voltage drop resistor coupled between two wires of said interface.

* * * * *